(12) United States Patent
Oates et al.

(10) Patent No.: US 10,263,425 B2
(45) Date of Patent: Apr. 16, 2019

(54) POWER TRANSMISSION NETWORK

(71) Applicant: General Electric Technology GmbH, Baden (CH)

(72) Inventors: Colin Donald Murray Oates, Brocton (GB); Bikash Pal, Carshalton on the Hill (GB); Linash Puthenpurayil Kunjumuhammed, Thornton Heath (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/559,715

(22) PCT Filed: Mar. 17, 2016

(86) PCT No.: PCT/EP2016/055897
§ 371 (c)(1),
(2) Date: Sep. 19, 2017

(87) PCT Pub. No.: WO2016/146795
PCT Pub. Date: Sep. 22, 2016

(65) Prior Publication Data
US 2018/0287386 A1 Oct. 4, 2018

(30) Foreign Application Priority Data

Mar. 19, 2015 (EP) .................................... 15275081

(51) Int. Cl.
*H02J 3/16* (2006.01)
*H02J 3/38* (2006.01)
*H02J 3/18* (2006.01)

(52) U.S. Cl.
CPC .............. *H02J 3/16* (2013.01); *H02J 3/1835* (2013.01); *H02J 3/386* (2013.01); *Y02E 10/763* (2013.01); *Y02E 40/34* (2013.01)

(58) Field of Classification Search
CPC . H02J 3/16; H02J 3/386; H02J 3/1835; Y02E 10/763; Y02E 40/34
See application file for complete search history.

(56) References Cited

U.S. PATENT DOCUMENTS

2014/0375128 A1 12/2014 Vieillard et al.

FOREIGN PATENT DOCUMENTS

| EP | 2 036 181 B1 | 7/2010 |
|---|---|---|
| FR | 2 980 052 A1 | 3/2013 |
| WO | 2014/012789 A1 | 1/2014 |

OTHER PUBLICATIONS

Li, S., et al., "A study on VSC-HVDC based black start compared with traditional black start," International Conference on Sustainable Power Generation and Supply, pp. 1-3 (2009) (Abstract).

(Continued)

*Primary Examiner* — Robert Deberadinis
(74) *Attorney, Agent, or Firm* — GE Global Patent Operation; Scott R. Stanley

(57) ABSTRACT

A power transmission network including a single-phase or multi-phase AC electrical system, a converter including an AC terminal, a point of common coupling, a phase reactance connecting the common coupling to each AC terminal, and a transmission medium to interconnect the common coupling and the electrical system. The network includes a controller to: process the voltage and current at the common coupling to compute a state vector; derive a converter demand by combining the state vector with control parameters, including the capacitance of the power transmission medium presented at the common coupling and the impedance of the phase reactance; and operate the converter according to demand controlling the voltage at each terminal and/or the common coupling to inhibit any perturbation in the converter voltage from a target converter voltage or (Continued)

range resulting from the interaction between the capacitance of the power transmission medium and the impedance of the phase reactance.

15 Claims, 12 Drawing Sheets

(56) References Cited

OTHER PUBLICATIONS

Maris, T.I., et al., "Stabilizers Enhancing the Frequency Regulation Action of HVDC Links Supplying Weak AC Systems," European Transactions on Electrical Power, vol. 3, No. 3, pp. 201-212 (May 1993).
Extended European Search Report and Opinion issued in connection with corresponding EP Application No. 15275081.6 dated Jul. 30, 2015.
International Search Report and Written Opinion issued in connection with corresponding PCT Application No. PCT/EP2016/055897 dated Jun. 6, 2016.
International Preliminary Report on Patentability issued in connection with corresponding PCT Application No. PCT/EP2016/055897 dated Sep. 19, 2017.

POWER TRANSMISSION NETWORK

FIELD OF INVENTION

This invention relates to a power transmission network, and a method of controlling a power transmission network.

BACKGROUND OF THE INVENTION

In power transmission networks alternating current (AC) power is converted to direct current (DC) power for transmission via overhead lines, under-sea cables, underground cables, and so on. This conversion to DC power removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. A converter, such as a voltage source converter, provides the required conversion between AC power and DC power within the network.

A typical such power transmission network includes AC-DC converters, which are connected via a DC transmission link and are arranged to interconnect an AC electrical system and a DC electrical network.

According to a first aspect of the invention, there is provided a power transmission network comprising a single-phase or multi-phase AC electrical system, a converter including at least one AC terminal, a point of common coupling, a phase reactance connecting the point of common coupling to the or each AC terminal of the converter, and at least one power transmission medium to interconnect the point of common coupling and the AC electrical system, wherein the power transmission network further includes a converter controller programmed to: process the voltage and current at the point of common coupling to compute a state vector corresponding to the power transmission network; derive a converter demand by combining the computed state vector with a plurality of control parameters, wherein the plurality of control parameters includes the capacitance of the power transmission medium or media presented at the point of common coupling and the impedance of the phase reactance; and operate the converter in accordance with the converter demand to control the converter voltage at the or each AC terminal and/or the voltage at the point of common coupling so as to inhibit any perturbation in the converter voltage from a target converter voltage or range resulting from the interaction between the capacitance of the power transmission medium or media and the impedance of the phase reactance.

The inventors have found that the interaction between the capacitance of the power transmission medium or media and the impedance of the phase reactance can result in a disturbance that adversely affects the ability of the converter to stably control the voltage at the or each AC terminal and/or the voltage at the point of common coupling at a desired voltage level or within a desired voltage range.

The provision of the converter controller to operate the converter therefore enables stable control over the converter voltage at the AC terminal and/or the voltage at the point of common coupling in the event of any perturbation in the converter voltage from a target converter voltage or range resulting from the interaction between the capacitance of the power transmission medium or media and the impedance of the phase reactance. This in turn stabilises the operation of the power transmission network as a whole.

In addition, the use of full state feedback control principles by the converter controller enables stable control over the converter voltage at the AC terminal and/or the voltage at the point of common coupling in the power transmission network over a wide range of frequencies.

Moreover, the capability of the converter controller to use the full state feedback control principles on the basis of the voltage and current at the point of common coupling minimises the need for a plurality of communications links laid throughout the power transmission network in order to obtain information about the power transmission network required to compute the state vector.

The configuration of the power transmission network may vary depending on its operating requirements.

The converter controller may be programmed to process measurements of the voltage and current at the point of common coupling or predicted values of the voltage and current at the point of common coupling.

The converter controller may be, but is not limited to, a linear controller, a discrete controller, or a digital controller.

The converter may be an AC-DC converter or a DC-DC converter.

The AC electrical system may include at least one AC power element in the form of a power source, e.g. a variable power source. The variable power source may be a renewable power source, such as a wind farm.

The AC electrical system may be an AC electrical network that includes a plurality of AC power elements, such as one or more sources, one or more loads and one or more other power transmission media. Optionally each of the plurality of AC power elements may be separately connected to the point of common coupling via a respective one of the power transmission media.

The phase reactance may include a transformer connected between the point of common coupling and the or each AC terminal of the converter. The phase reactance may include one or more other reactances placed in the AC path of the converter, such as valve reactors used in the converter When a plurality of power transmission media interconnects the point of common coupling and the AC electrical system, the capacitance of the power transmission medium or media presented at the point of common coupling may be half of the total lumped capacitance of the power transmission medium or media.

The plurality of control parameters may be a matrix or vector of control parameters. The converter controller may be programmed to derive the converter demand by multiplying the computed state vector with the matrix or vector of control parameters to obtain a single value and by comparing the single value against a reference value to obtain a differential value that forms the converter demand.

The converter controller may be programmed to perform linear quadratic regulation (LQR) to derive the plurality of control parameters. The use of LQR allows the definition of the plurality of control parameters to provide an optimised robust response to any perturbation in the converter voltage from a target converter voltage or range resulting from the interaction between the capacitance of the power transmission medium or media and the impedance of the phase reactance.

The converter controller may be programmed to perform a three phase stationary reference frame to direct/quadrature rotating reference frame transformation (abc-to-dq) of the computed state vector prior to its combination with the plurality of control parameters to derive the converter demand. The use of an abc-to-dq transformed state vector by the converter controller further enhances the control over the converter voltage at the or each AC terminal and/or the voltage at the point of common coupling, particularly when such use is combined with the performance of linear quadratic regulation to derive the plurality of control parameters.

The power transmission network may further include an inductive or capacitive VAR compensator. When the VAR compensator is a capacitive VAR compensator, the capacitance of the VAR compensator is in an embodiment lower than the capacitance of the power transmission medium or the summed capacitance of the power transmission media.

The inclusion of an inductive VAR compensator minimises any detrimental effect a surge of power in the power transmission medium or media may have on the insulation associated with the power transmission medium or media. Meanwhile the inclusion of a capacitive VAR compensator minimises any adverse effect a variation in performance of the power transmission network may have on the stability of the control of the converter voltage at the or each AC terminal and/or the voltage at the point of common coupling.

The converter controller may be programmed to modify the plurality of control parameters in response to a change in the capacitance of the power transmission medium or the summed capacitance of the power transmission media. This may be done by modifying the plurality of control parameters in accordance with the states of circuit breakers associated with the power transmission media and/or in accordance with any changes in the performance of the power transmission network.

The converter controller may be programmed to process a proportional servo gain when deriving the converter demand, the value of the proportional servo gain being set to control the short circuit level of the AC electrical system so as to stabilise the voltage of the AC electrical system. The ability of the converter controller to operate the converter to stably control the converter voltage at the or each AC terminal and/or the voltage at the point of common coupling permits the use of a servo gain that is set at a sufficiently high value to achieve a desired short circuit level of the AC electrical system so as to stabilise the voltage of the AC electrical system, without the servo gain adversely affecting the stability of the power transmission network.

In such embodiments, the converter controller may be configured to use proportional feedback to set the value of the proportional servo gain to control the short circuit level of the AC electrical system. The proportional feedback may include a low pass filter.

According to a second aspect of the invention, there is provided a method of controlling a power transmission network, the power transmission network comprising a single-phase or multi-phase AC electrical system, a converter including at least one AC terminal, a point of common coupling, a phase reactance connecting the point of common coupling to the or each AC terminal of the converter, and at least one power transmission medium to interconnect the point of common coupling and the AC electrical system, wherein the method includes the steps of: process the voltage and current at the point of common coupling to compute a state vector corresponding to the power transmission network; derive a converter demand by combining the computed state vector with a plurality of control parameters, wherein the plurality of control parameters includes the capacitance of the power transmission medium or media presented at the point of common coupling and the impedance of the phase reactance; and operate the converter in accordance with the converter demand to control the converter voltage at the or each AC terminal and/or the voltage at the point of common coupling so as to inhibit any perturbation in the converter voltage from a target converter voltage or range resulting from the interaction between the capacitance of the power transmission medium or media and the impedance of the phase reactance.

The features and corresponding advantages of the first aspect of the invention applies mutatis mutandis to the second aspect of the invention.

BRIEF DESCRIPTION OF THE DRAWINGS

An embodiment of the invention will now be described, by way of a non-limiting example, with reference to the accompanying drawings in which.

DETAILED DESCRIPTION OF THE INVENTION

Figure 1:
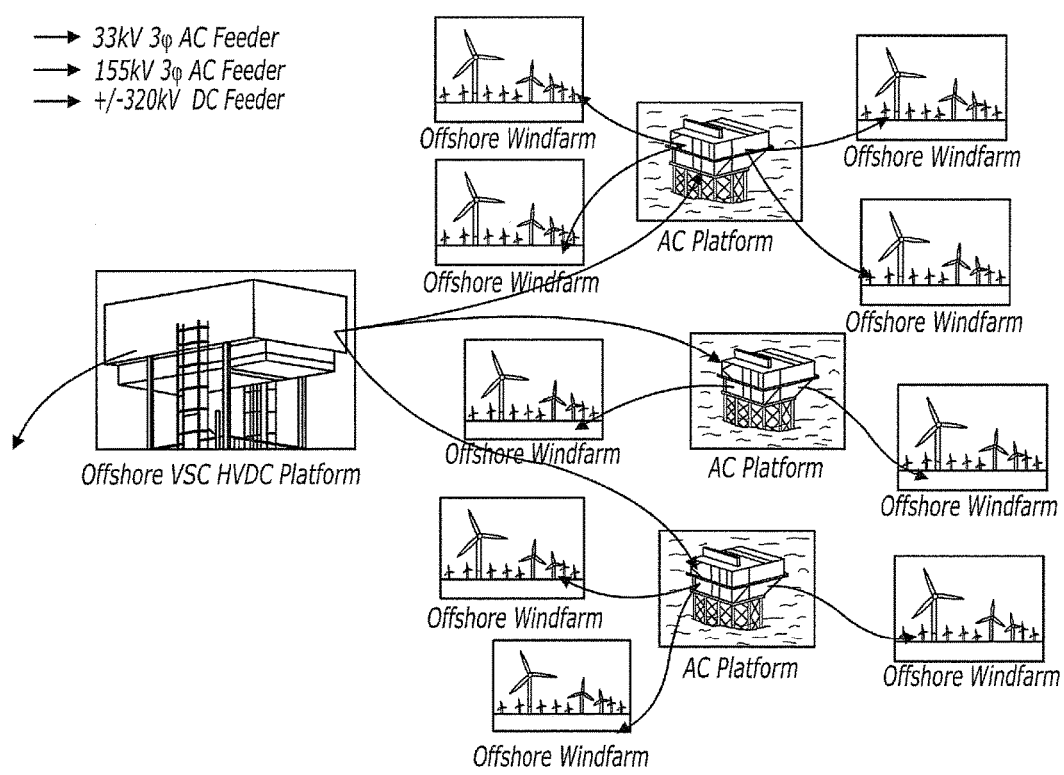
FIG. 1 shows the layout of a power transmission network in the form of a wind farm power generation scheme.

A power transmission network according to an embodiment of the invention is shown in FIG. 1.

It will be appreciated that the numerical values assigned to the properties of the various parts of the power transmission network are intended to help illustrate embodiments of the invention, and may vary from the exemplary values described hereinafter depending on the requirements of the power transmission network.

The power transmission scheme is in the form of a wind farm power generation scheme.

The power transmission network comprises an AC electrical system (which may be single-phase or multi-phase), an AC-DC converter, a point of common coupling, and a phase reactance including parallel step-up converter transformers, with a rating sufficient for the AC electrical system to which they are connected plus sufficient redundancy such that in the event of one of the parallel transformers being taken out of service, for example, for maintenance, more than half the power can continue to be transmitted by the remaining transformer. For an AC electrical system network with a rating of 600 MW, the individual transformer ratings may be, for example, 400 MW. The step-up converter transformers connect the point of common coupling to an AC terminal of the converter (or a plurality of AC terminals of the converter in the case of a multi-phase AC electrical system). The AC electrical system includes a plurality of AC power sources in the form of offshore wind farms, each of which is connected to a primary side of the step-up converter transformers, thus connecting each AC power source to the step-up converter transformers and therefore to the converter.

More specifically, medium voltage (e.g. 155 kV) feeder power transmission cables radiate outwards from the point of common coupling to a plurality of subsidiary AC platforms, each containing a respective step-down transformer of appropriate rating, for example 120 MVA to 180 MVA. A set of low voltage (e.g. 33 kV) power transmission cabling then radiates outwards from each of these AC platforms to a respective plurality of the offshore windfarms, which are indicated as the 334.8 MW, 93×3.6 MW, 165 MW and 33×5 MW windfarms in the schematic representation of FIG. 2. A medium voltage feeder power transmission cable may bypass the AC platforms to directly connect the point of common coupling to a wind farm, which is indicated as the 400 MW wind farm in FIG. 2.

The provision of the power transmission cables and cabling permits transmission of power from the wind farms to the AC-DC converter before being further transmitted via high voltage direct current (HVDC) power transmission lines to shore. In use, the converter controls the voltage at the point of common coupling to a desired magnitude and frequency in order to facilitate the transmission of power via the power transmission cables from the wind farms, which can provide a variable amount of power.

Each of the power transmission cables and cabling may be protected and disconnected by switchgear (not shown).

The power transmission network further includes a converter controller to operate the converter in accordance with a converter demand to control the voltage at its AC terminal and the voltage at the point of common coupling.

The medium voltage feeder power transmission cables can be up to 30 km in length, with a total of 200 wind turbines being included in the wind farm power generation scheme and with each wind turbine of the wind farms being separated by each neighbouring wind turbine, e.g. by approximately 1 km or any other distance required to ensure safe and reliable operation of each wind turbine. Consequently, it is possible for there to be a total of 200 km of low voltage power transmission cabling. The large amount of subsea cables and cabling means that there is a large capacitive load presented by the medium voltage feeder power transmission cables and low voltage power transmission cabling to the point of common coupling, which has a characteristic dominated by the inductance of the step-down transformers.

During the operation of the power transmission network, the capacitance of the power transmission cables and cabling may interact with the reactance of the step-up converter transformers to an extent that results in a high degree of resonance in the power transmission network. The extent of the resonance varies with the length of the power transmission cables. The resonance between the capacitance of the power transmission cables and cabling and the reactance of the step-up converter transformers may result in a disturbance that adversely affects the ability of the converter to stably control the voltage at its AC terminal and the voltage at the point of common coupling at a desired voltage level or within a desired voltage range.

Figure 2:
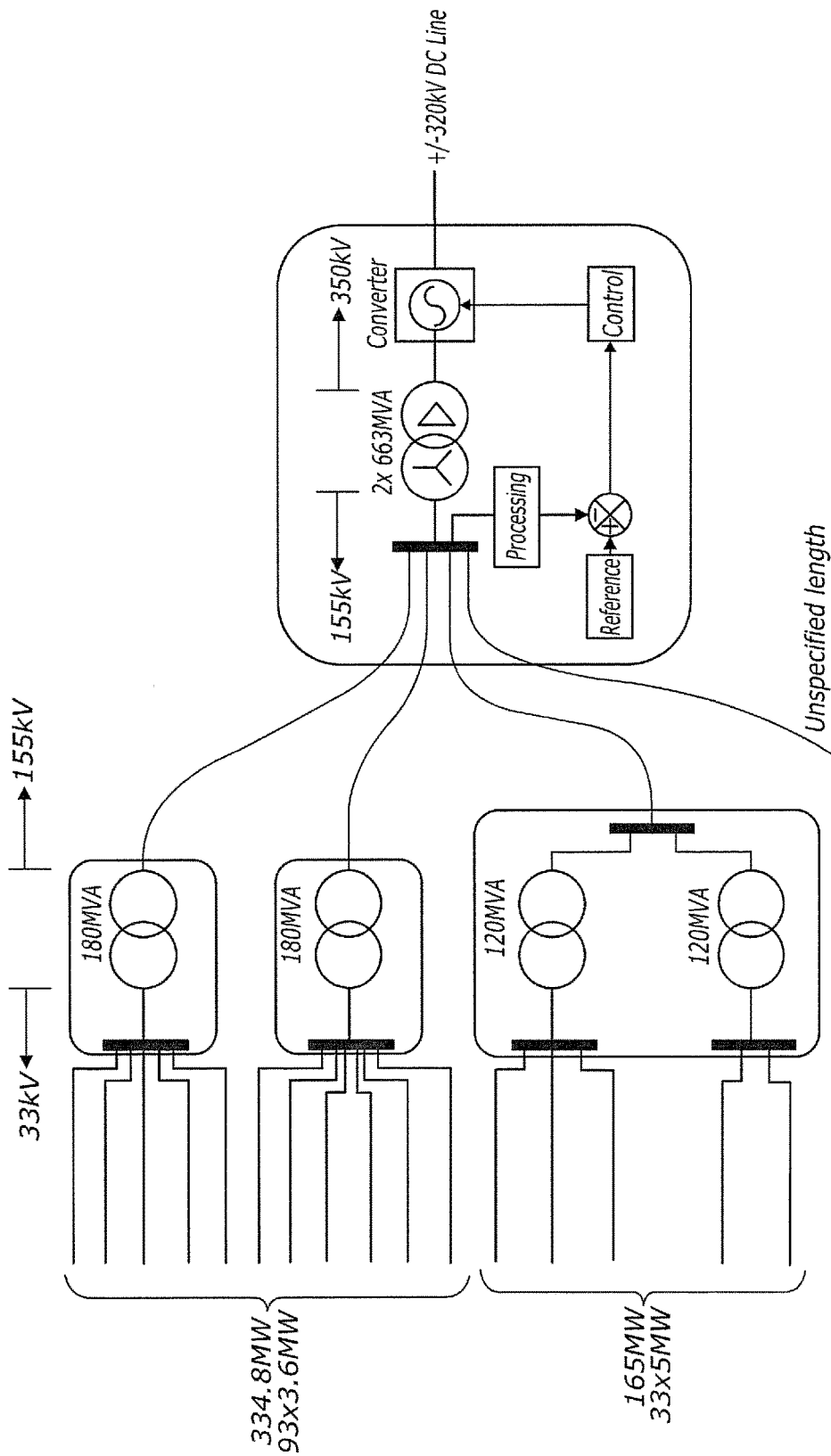
FIG. 2 shows a schematic representation of the power transmission network of FIG. 1.
Figure 3:
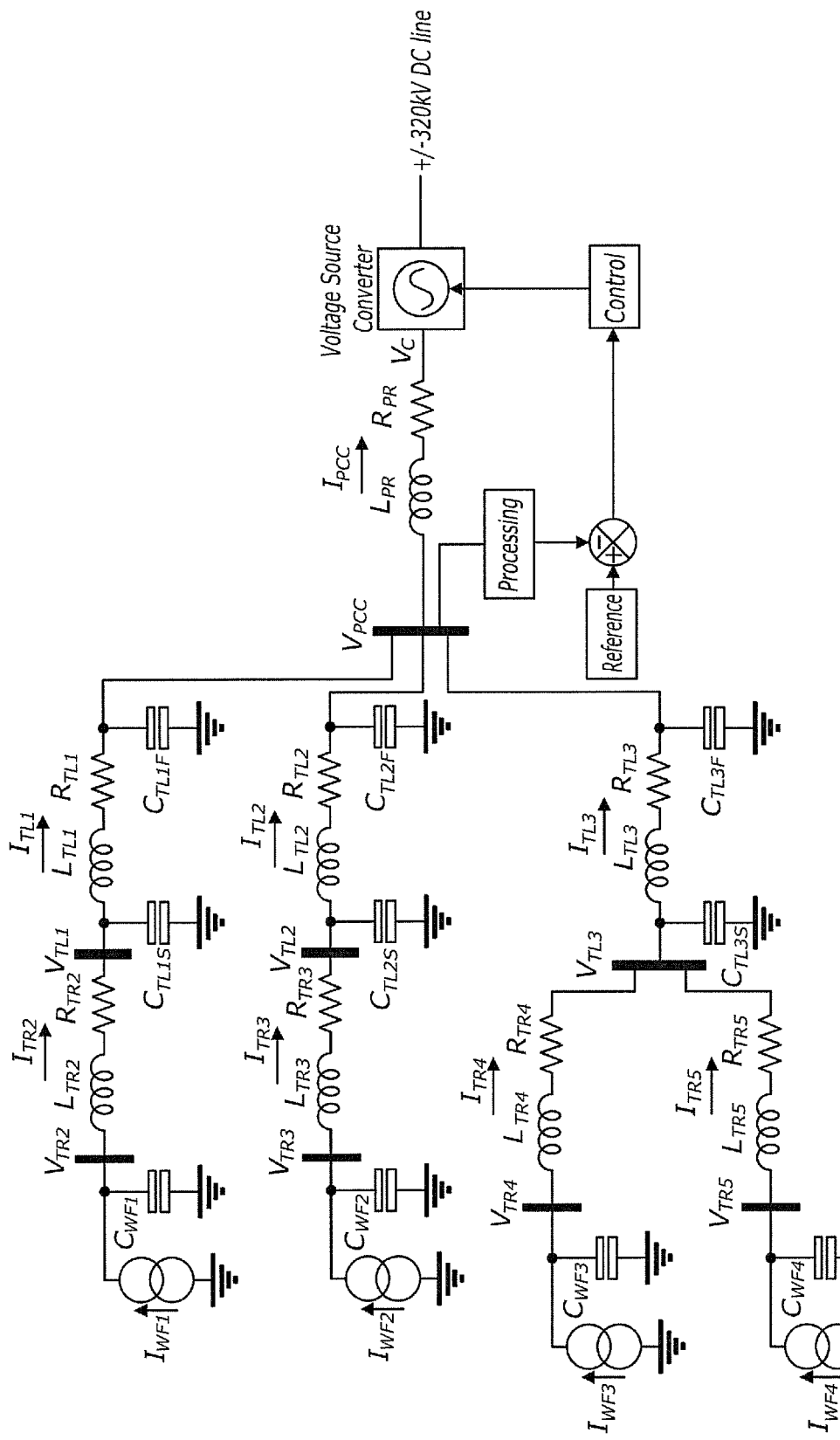
FIG. 3 shows an equivalent electrical representation of the schematic representation of FIG. 2.

FIG. 3 shows an equivalent electrical representation of the schematic representation of FIG. 2 in which the power transmission cables and cabling have been represented as a single 'Π' section of inductors, resistors and capacitors and in which the step-down transformers and the step-up converter transformers have been represented by their series inductance and resistance.

Figure 4:
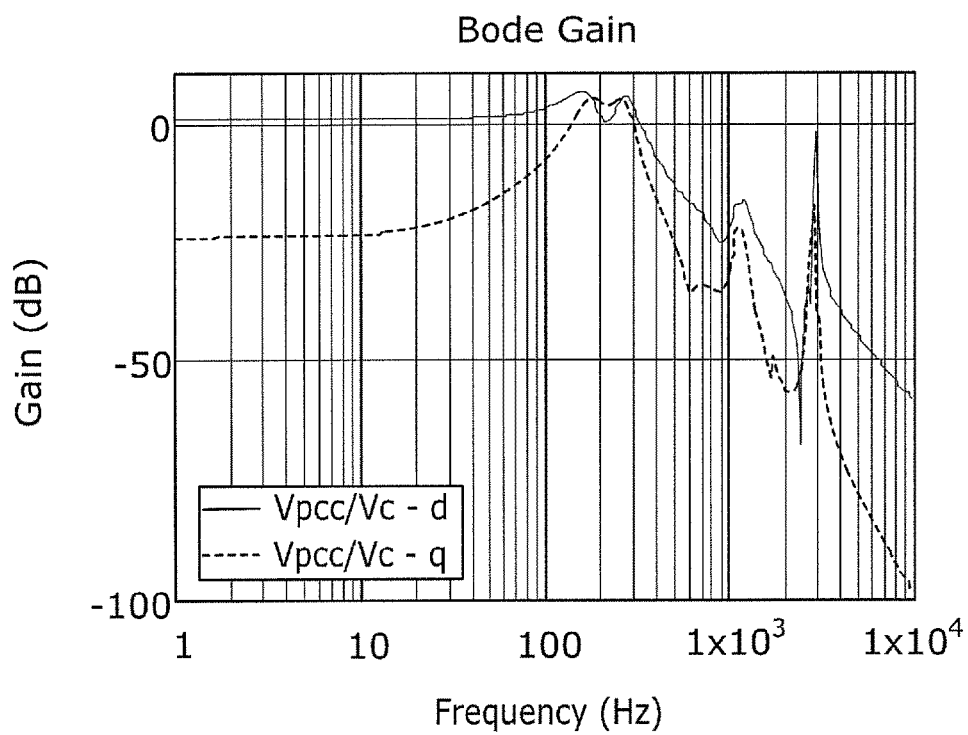
FIG. 4 shows a Bode plot of a transfer function mapped in direct-quadrature form.

FIG. 4 illustrates a Bode plot for the transfer function between the converter voltage at the AC terminal and the voltage at the point of common coupling, whereby the transfer function is mapped into direct-quadrature form. It can be seen from FIG. 4 that there are strong resonances within the feeder power transmission cables in the 1 kHz and 2 kHz region and in the 200 Hz to 300 Hz region.

Figure 5:
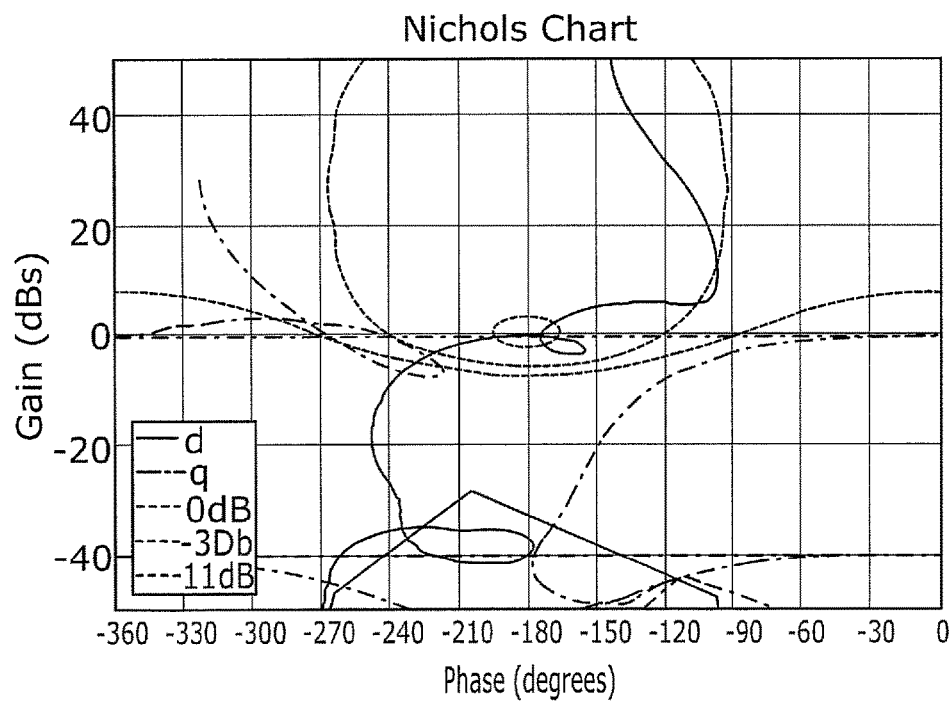
FIG. 5 shows a Nichols chart of the control of a converter of the power transmission network of FIG. 1.

FIG. 5 illustrates a Nichol Chart of the control of the converter, from which it can be seen that the loci for the 'direct' system response passes directly across the critical point. Stability can be obtained by significantly reducing the servo loop gain, thus imposing severe limitations on the bandwidth of the converter.

The operation of the converter to ensure stability of the power transmission network is described as follows.

A cause of instability in the power transmission network can arise from the large amount of capacitance in the low voltage power transmission cabling that interconnect the AC platforms and the wind farms interacting with the step-up converter transformers. This however typically has a high enough frequency to be of a minor disturbance to the VSC operation.

The main cause of instability in the power transmission network is the interaction between the summed capacitance of the medium voltage feeder power transmission cables interacting with the impedance of the phase reactance to cause a resonance, typically in the 200 Hz to 300 Hz region, close to the required bandwidth of the converter.

Figure 6:
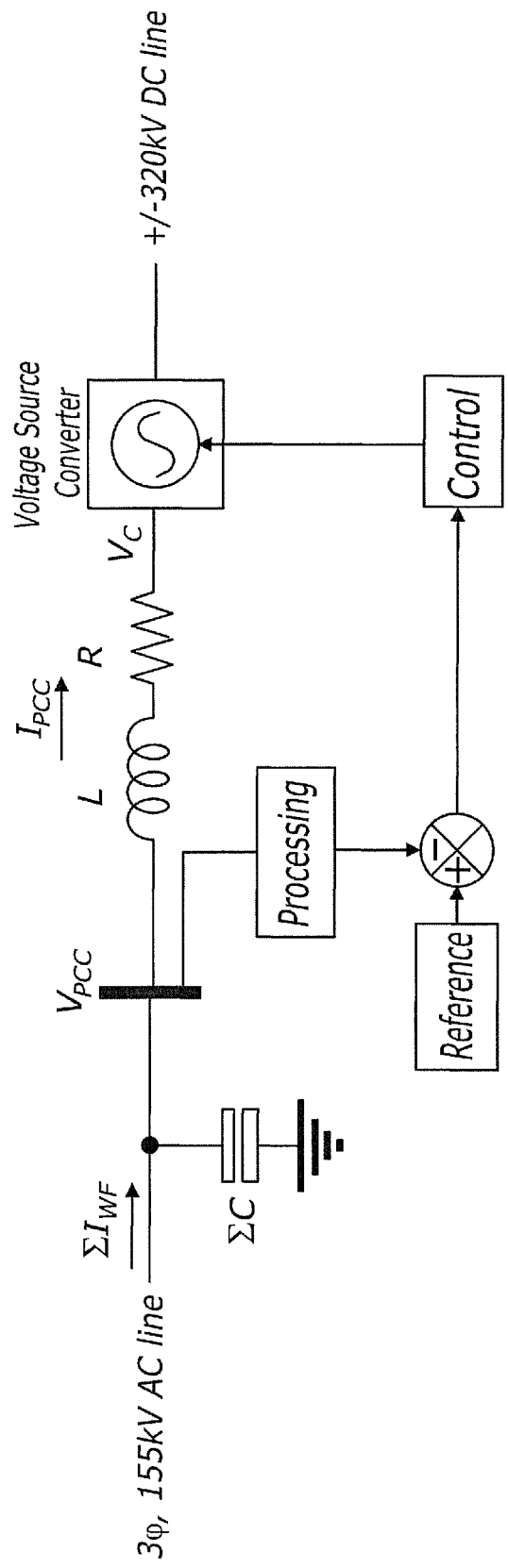
FIG. 6 shows a simplified model relating to the converter control of the equivalent electrical presentation of FIG. 3.

A state space representation for a single-phase power transmission network, based on the simplified model of FIG. 6, is given by:

$$\frac{d}{dt}\begin{pmatrix} I_{PCC} \\ V_{PCC} \end{pmatrix} = \begin{pmatrix} -\frac{R}{L} & \frac{1}{L} \\ -\frac{1}{\Sigma C} & 0 \end{pmatrix} \cdot \begin{pmatrix} I_{PCC} \\ V_{PCC} \end{pmatrix} + \begin{pmatrix} \frac{1}{L} \\ 0 \end{pmatrix} \cdot V_C + \begin{pmatrix} 0 \\ \frac{1}{\Sigma C} \end{pmatrix} \cdot \Sigma I_F$$

Where IPCC and VPCC are the current and voltage at the point of common coupling respectively; R and L are the resistance and inductance of the step-up converter transformers respectively; ΣC is the lumped capacitance of the power transmission cables presented at the point of common coupling; VC is the converter voltage at the AC terminal; ΣIF is the lumped current flowing in the power transmission cables.

The lumped capacitance of the power transmission cables is based on an equivalent 'Π' model of the power transmission cables. Hence, assuming the cabling is modelled as a single stage equivalent Π network, the lumped capacitance presented at the PCC by the feeder power transmission cables is half the value of the total lumped capacitance.

The power transmission network includes sensors to measure the voltage and current at the point of common coupling. The converter controller is programmed to process the measurements of the voltage and current at the point of common coupling to compute a state vector that is based on the above state space representation of the power transmission network. The converter controller is also programmed to derive the converter demand by multiplying the computed state vector with a vector of control parameters, which is also based on the above state space representation, to obtain a single value and by comparing the single value against an inner loop reference value to obtain a differential value that forms the converter demand.

In other embodiments of the invention, it is envisaged that the converter controller may be programmed to process predicted values of the voltage and current at the point of common coupling to compute the state vector.

In still other embodiments of the invention, it is envisaged that the vector of control parameters may be replaced by another matrix of control parameters depending on the configuration of the power transmission network.

This allows the converter to be operated in accordance with the converter demand to control the converter voltage at the AC terminal and the voltage at the point of common coupling, so as to inhibit any perturbation in the converter voltage from a target converter voltage or range resulting from the interaction between the summed capacitance of the power transmission cables and the impedance of the phase reactance.

The derivation of the vector of control parameters may be carried out using standard control techniques such as pole placement, but may also be carried out using the principle of Linear Quadratic Regulation in which the gain is derived as the minimisation of the cost function:

$$J = \int_0^\infty (x^T(t) \cdot Q \cdot x(t) + u^T(t) \cdot R \cdot u(t))dt$$

where the square matrices Q and R are selected according to the required system performance. The optimal stabilising control for this system is:

$$u(t) = -R^{-1} \cdot B^T \cdot P \cdot x(t)$$

where P is the symmetric positive semi-definite solution of the Algebraic Riccati Equation (ARE):

$$0 = PA + A^T P + Q - PBR^{-1}BP$$

The measurements of the voltage and current at the point of common coupling is combined into the state vector, and the resulting combination is multiplied by the gain $K = R^{-1} \cdot B^T \cdot P$ before being combined with the output reference from the integral compensation of voltage to form the inner LQR loop. The outer loop regulates the converter voltage by directly comparing the measurement of the voltage at the point of common coupling with a reference value and passing it to the integral compensation which provides the output reference for the inner LQR loop.

Figure 7:
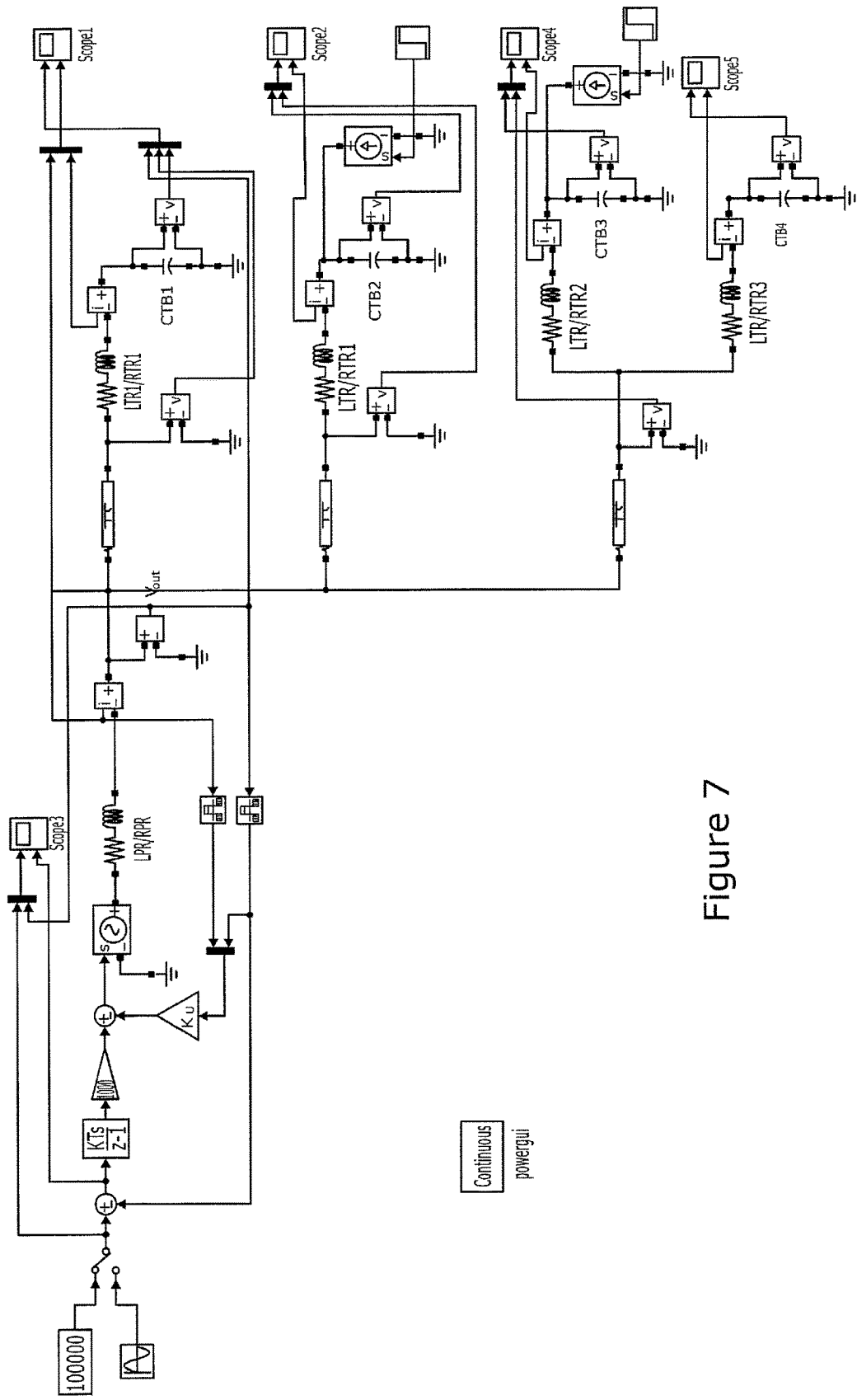
FIG. 7 shows a single-phase simulation model based on the equivalent electrical representation of FIG. 3.

FIG. 7 shows a single-phase simulation model based on the equivalent electrical representation of FIG. 3, whereby the power transmission cables are represented by 10 section 'Π' networks so as to demonstrate that the approximation of a plurality of power transmission cables with a single 'Π' in the control does not affect the stability of the power transmission network when a distributed model of the power transmission cables is introduced.

Figure 8:
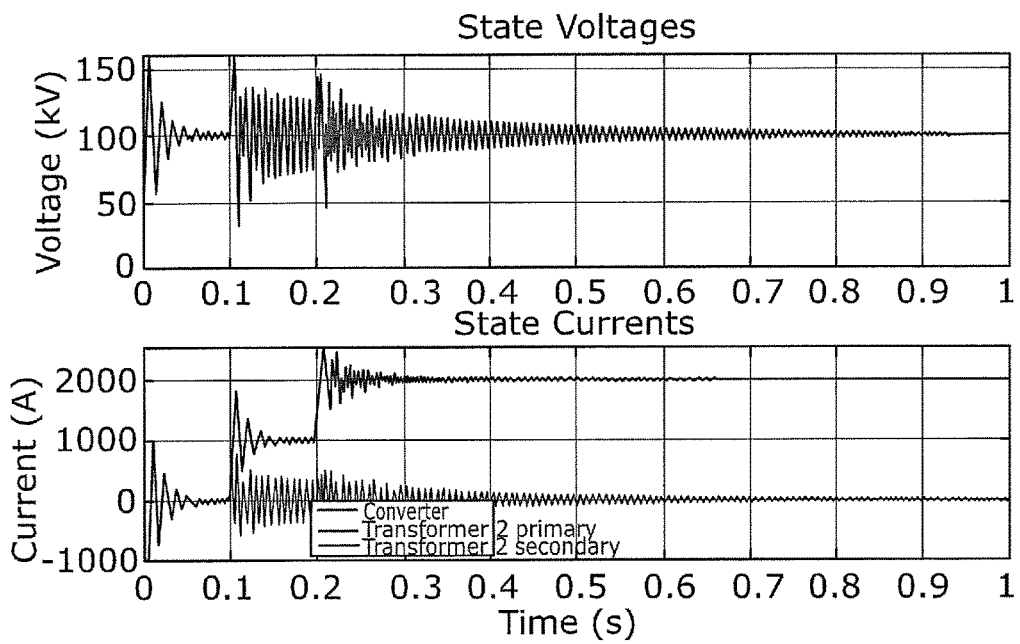
FIGS. 8 and 9 illustrates the results of the simulation shown in FIG. 7.

FIG. 8 shows the step response for the model of FIG. 7 when a step voltage is applied at 0 seconds and current sources are applied at 100 milliseconds and 200 milliseconds, whereby the current sources represent the individual windfarms. It can be seen from FIG. 8 that, while there is a significant amount of disturbance applied to the power transmission network due to the resonance between the summed capacitance of the power transmission cables and the impedance of the phase reactance, the operation of the power transmission network as a whole remains stable. It is also noted that disturbances occur upon application of the current sources.

Figure 9:
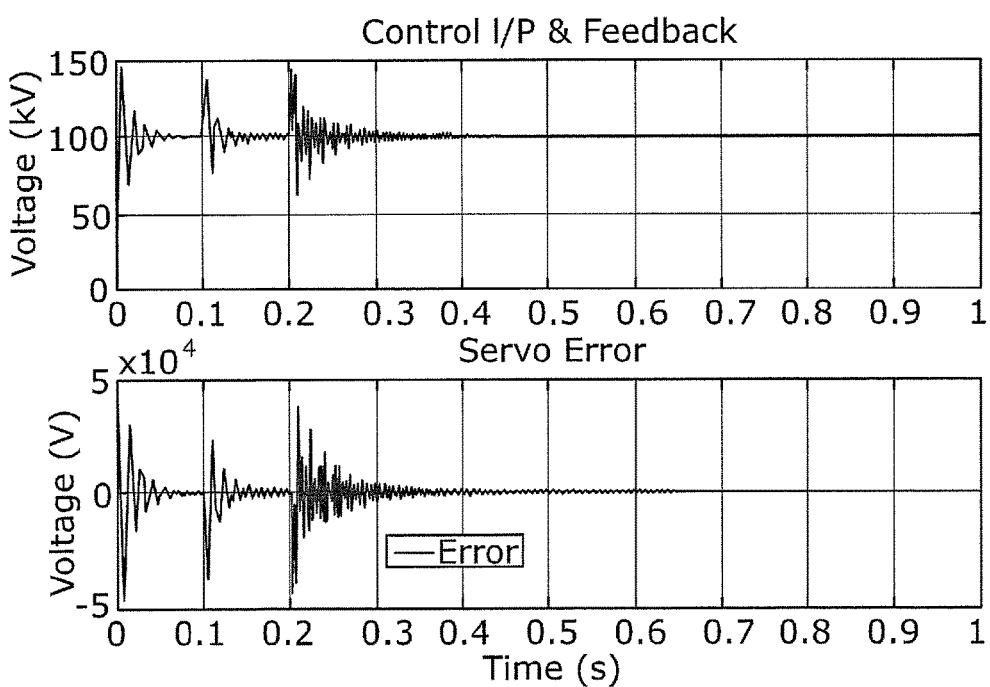

FIG. 9 shows the servo terms that indicate the occurrence of high frequency disturbances to the power transmission network upon application of the current sources, and also show that the operation of the power transmission network is stable despite the occurrence of the high frequency disturbances.

It is envisaged that, in other embodiments of the invention, the converter controller may be configured to implement a plurality of independent single-phase servos, each independent single-phase servo being associated with a respective phase of a multi-phase (e.g. three-phase) power transmission network, whereby each independent single-phase servo is identical in implementation to the single-phase servo described above.

For a 3 phase system, optionally, the converter controller may be programmed to perform a three phase stationary reference frame to direct/quadrature rotating reference frame transformation (abc-to-dq) of the computed state vector prior to its combination with the vector of control parameters to derive the converter demand.

A direct-quadrature state space representation of a multi-phase power transmission network can be obtained as follows.

By building up the state space matrices for the full 'abc' system and then substituting the standard form:

$$x_{dq}^P = [T_{\alpha\beta}^P] \cdot C_0 \cdot x_{abc}$$

where $x_{abc}$ represents the three phase data as three independent vectors in a stationary frame and $x_{dq}$ represents the three phase data as a single vector represented in a Cartesian sense in a rotating reference frame by the "direct" and "quadrature" values $$C_0 = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix}$$

$$[T_{\alpha\beta}^P] = \begin{pmatrix} \cos(\omega_0 t) & \sin(\omega_0 t) \\ -\sin(\omega_0 t) & \cos(\omega_0 t) \end{pmatrix}$$

The transformation then gives the direct-quadrature state space representation as:

$$\frac{d}{dt}\begin{pmatrix} I_{PCCd} \\ I_{PCCq} \\ V_{PCCd} \\ V_{PCCq} \end{pmatrix} = \begin{pmatrix} -\frac{R}{L} & \omega_0 & \frac{1}{L} & 0 \\ -\omega_0 & -\frac{R}{L} & 0 & \frac{1}{L} \\ -\frac{1}{\Sigma C} & 0 & 0 & \omega_0 \\ 1 & -\frac{1}{\Sigma C} & -\omega_0 & 0 \end{pmatrix} \cdot \begin{pmatrix} I_{PCCd} \\ I_{PCCq} \\ V_{PCCd} \\ V_{PCCq} \end{pmatrix} +$$

$$\begin{pmatrix} -\frac{1}{L} & 0 \\ 0 & -\frac{1}{L} \\ 0 & 0 \\ 0 & 0 \end{pmatrix} \cdot \begin{pmatrix} V_{Cd} \\ V_{Cq} \end{pmatrix} + \begin{pmatrix} 0 & 0 \\ 0 & 0 \\ \frac{1}{\Sigma C} & 0 \\ 0 & \frac{1}{\Sigma C} \end{pmatrix} \cdot \begin{pmatrix} \Sigma I_{Fd} \\ \Sigma I_{Fq} \end{pmatrix}$$

Where d and q denote the direct and quadrature components respectively; IPCCd and VPCCd are the direct components of the current and voltage at the point of common coupling respectively; IPCCq and VPCCq are the quadrature components of the current and voltage at the point of common coupling respectively; R and L are the resistance and inductance of the phase reactance that is principally represented by the step-up converter transformers, but which may include other reactances placed in the AC path of the converter such as valve reactors used in the converter; ΣC is the lumped capacitance of the power transmission cables presented at the point of common coupling; VCd and VCq are the direct and quadrature components of the converter voltage at the AC terminals respectively; ΣIFd and ΣIFq are the direct and quadrature components of the lumped current flowing in the power transmission cables respectively; ω0 is the power frequency expressed in radians per second.

Figure 10:
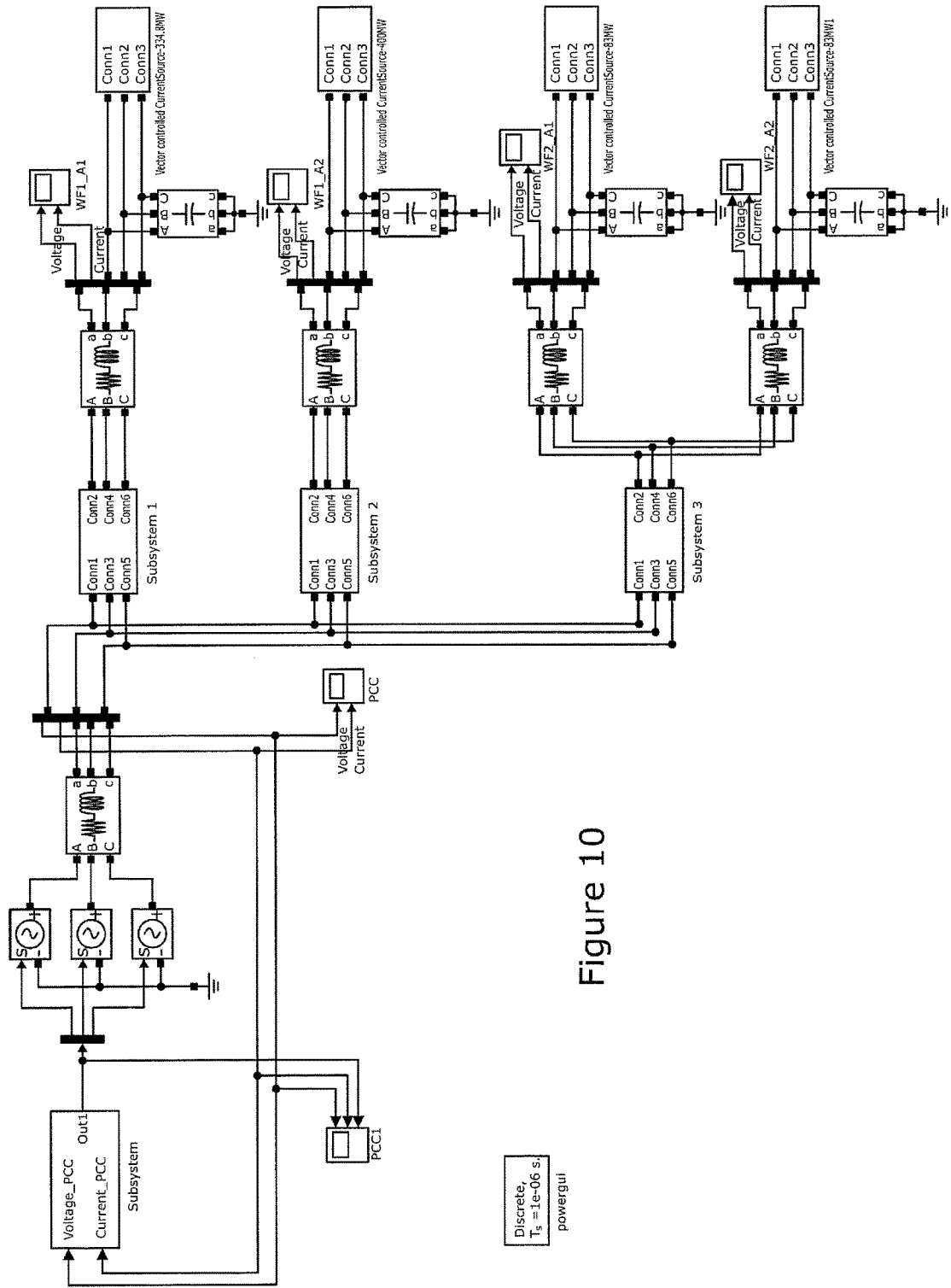
FIG. 10 shows a three-phase simulation model based on the equivalent electrical representation of FIG. 3.
Figure 11:
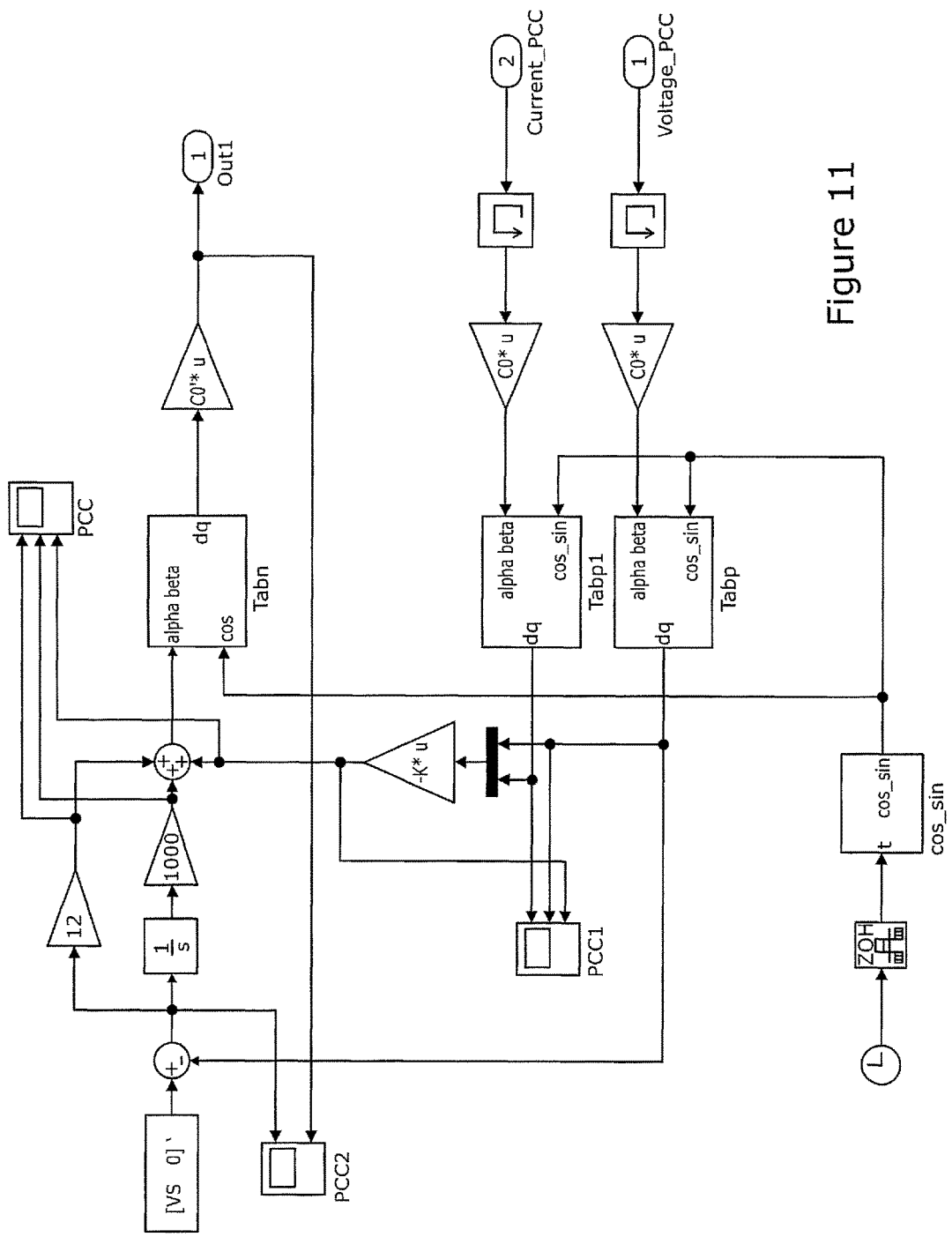
FIG. 11 schematically shows an exemplary layout of a converter controller.

FIG. 10 shows a three-phase simulation model based on the equivalent electrical representation of FIG. 3. FIG. 11 shows the converter controller with the state feedback and the LQR gain "K" forming the inner LQR loop and a proportional-integral control for the outer converter voltage regulation.

Figure 12:
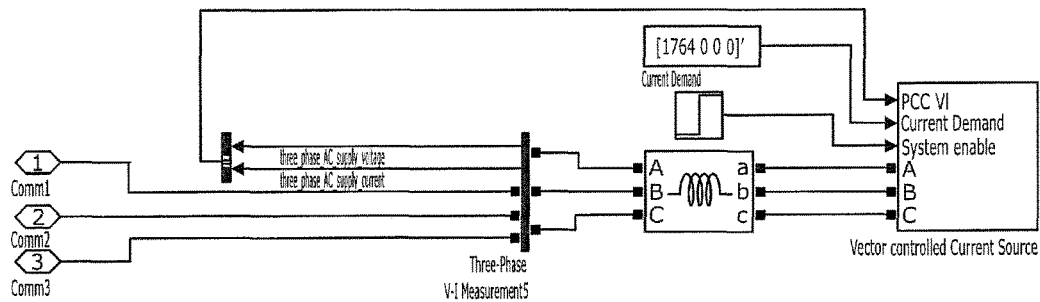
FIG. 12 shows the top-level form of a vector controlled current source that is used to represent the individual wind farms at the end of the collector system.

In the three-phase simulation model, the converter is used with a three phase voltage source that is controlled using a standard vector control so that a real, constant current can be injected while the phase along the feeder power transmission cables may vary. FIG. 12 shows the form of such a source with a given phase reactance represented by the three phase inductive block, the measurement of voltage and current at the point of common coupling being fed back into the control, the peak current demand for the four current terms—positive direct, positive quadrature, negative direct and negative quadrature, and the step function to give a delay to the enabling of the current source.

Figure 13:
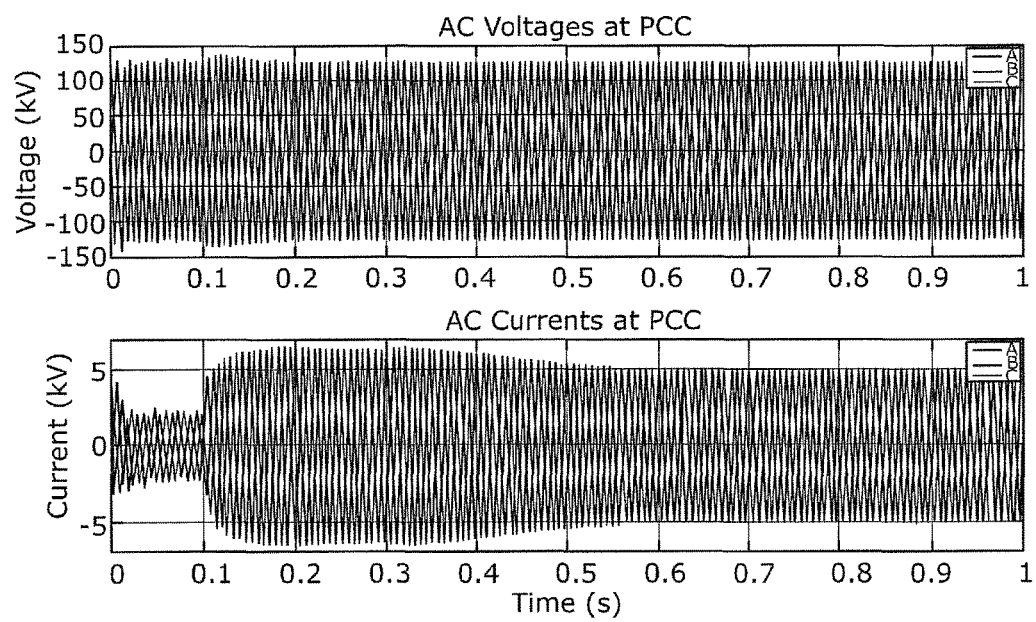
FIGS. 13 and 14 illustrates the currents and voltages at the point of common coupling in the power transmission network of FIG. 10.

FIG. 13 illustrates the currents and voltages at the point of common coupling in the power transmission network of FIG. 10 when the converter controller of FIG. 11 is used to operate the converter in the three-phase simulation model of FIG. 10. The voltages at the point of common coupling can be seen to be quickly established. The four current terms are started simultaneously at 100 ms into the simulation to give as sharp a disturbance to the voltages as possible. The current envelope is due to the servo properties of the current source.

Figure 14:
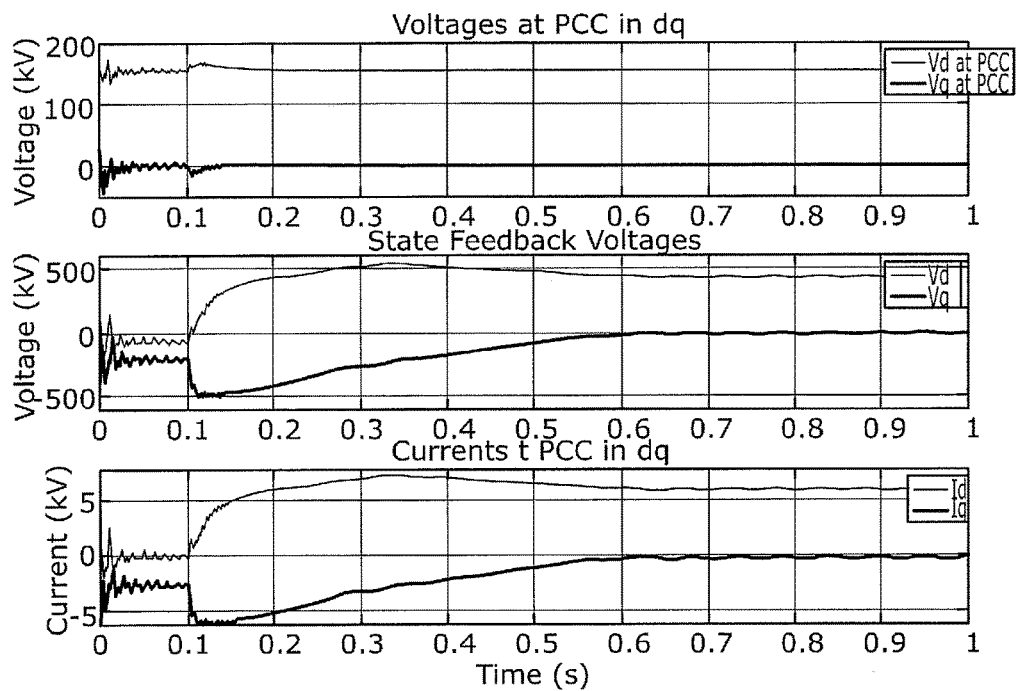

FIG. 14 illustrates the direct and quadrature components of the currents and voltages at the point of common coupling shown in FIG. 13. It can be seen from FIG. 14 that the voltages settle very quickly and the currents stabilise over a period of 500 ms in direct and quadrature, as a result of the dynamics of the vector control in the current source.

It can be seen from FIGS. 13 and 14 that the voltages at the point of common coupling is well-controlled while there is a small transient step as the current source is applied at 100 ms. The shape of the currents at the point of common coupling is directly due to the vector control of the current source, since the corresponding proportional-integral controls are slow to settle.

The provision of the converter controller to operate the converter therefore enables stable control over the converter voltage at the AC terminal(s) and the voltage(s) at the point of common coupling in the event of any perturbation in the converter voltage from a target converter voltage or range resulting from the interaction between the summed capacitance of the power transmission cables and the impedance of the phase reactance. This in turn stabilises the operation of the power transmission network, as a whole, since natural damping within the power transmission network, allows the disturbance to decay.

In addition, the use of full state feedback principles by the converter controller enables stable control over the converter voltage at the AC terminal(s) and the voltage(s) at the point of common coupling work over a wide range of frequencies.

Moreover, the capability of the converter controller to use the full state feedback principles on the basis of the voltage and current at the point of common coupling minimises the need for a plurality of communications links laid throughout the power transmission network in order to obtain information about the power transmission network required to compute the state vector.

The power transmission network may further include a VAR compensator in the form of a capacitance bank. The capacitance of the VAR compensator is lower than the summed capacitance of the power transmission cables. The inclusion of such a VAR compensator minimises any adverse effect a variation in performance of the power transmission network may have on the stability of the control of the converter voltage at the or each AC terminal and/or the voltage at the point of common coupling.

The power transmission network may further include a VAR compensator in the form of an inductance bank. The inclusion of an inductive VAR compensator minimises any detrimental effect a surge of power in the power transmission cables may have on the insulation associated with the power transmission cables.

The overall characteristics of the power transmission cables may change due to, for example, disconnection of one or some of the plurality of power transmission cables. This change in characteristics of the power transmission cables may affect the accuracy of the operation of the converter controller to stably control the converter voltage at the AC terminal(s) and the voltage(s) at the point of common coupling.

Optionally the converter controller may be programmed to modify the vector of control parameters in response to a change in the summed capacitance of the power transmission cables, so as to permit uninterrupted operation of the converter controller to stably control the converter voltage at the AC terminal(s) and the voltage(s) at the point of common coupling. This may be done by modifying the vector of control parameters in accordance with the states of circuit breakers associated with the plurality of power transmission cables and/or in accordance with any changes in the performance of the power transmission network.

A vector control connected to an AC electrical system with a short circuit level requires that the short circuit level of the AC electrical system is greater than a given multiple of the rating of the converter using the vector control. Typically, this multiple is in the region of 2.7 but may vary depending on a number of variables, particularly with the level of reactive power in the power transmission network.

This also applies to a lumped system that includes a plurality of vector controls in operation across an array of feeders.

Figure 15:
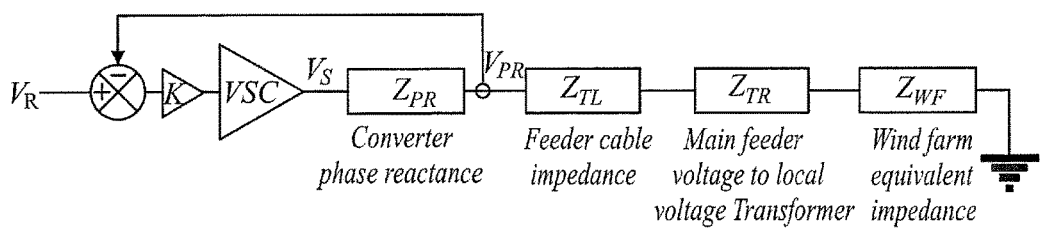
FIG. 15 shows a simplified representation of the power transmission network of FIG. 2.

Hence, it is necessary to assess the minimum required short circuit level for each feeder and then to combine them to give an overall short circuit level that will be required by the AC electrical system. Considering FIG. 15, there is a phase reactance principally formed from the leakage reactance of the step-up converter transformers, there is a voltage feedback from the point of common coupling, an error amplifier and a compensation gain. The feeder itself is formed from the feeder power transmission cables and the step-down transformer leakage reactance that is stepping down the medium feeder voltage (e.g. 155 kV) to a local voltage (e.g. 33 kV) for a given wind farm. If the lumped rating of the AC electrical system is, for example, 600 MW, the required short circuit level for the AC electrical system will be approximately 1.62 GVA based on a multiple of 2.7. The minimum short circuit level of the AC electrical system shown in FIG. 15 is given by the following rule:

$$\frac{V_S^2}{Z_{PR}/K + Z_{TL} + Z_{TR}} > K_{VC} \cdot P_{VC}$$

where VS is the output converter voltage of the converter, KVC is the vector control factor (which is 2.7 in the example above) and PVC is the power rating of the AC electrical system (which is 600 MW in the example above). In this expression, it is likely that the impedances ZPR, ZTL, ZTR of the phase reactance, the feeder power transmission cables and the step-down transformers are defined by the power transmission network design. This means that the remaining variable to achieve so the only variable available to achieve the minimum short circuit level that follows the above rule is the servo gain K. Since the servo gain is related to the control bandwidth of the converter, the application of the required value of K requires sufficiently stable operation of the converter, which as described above is achieved by embodiments of the invention.

It should be noted that the required servo gain must be achieved through proportional feedback. It can be difficult to achieve the required servo gain, particularly where the vector control is implemented in discrete form.

The vector control instability is typically in the 20-30 Hz region. This makes it possible to introduce a low pass filter into the proportional feedback where the knee point is significantly above that of the likely vector control oscillation, which for example may be greater than 100 Hz. Since the low pass filter affects the phase margin, its use must be carried out in coordination with the integral control.

Figure 16:
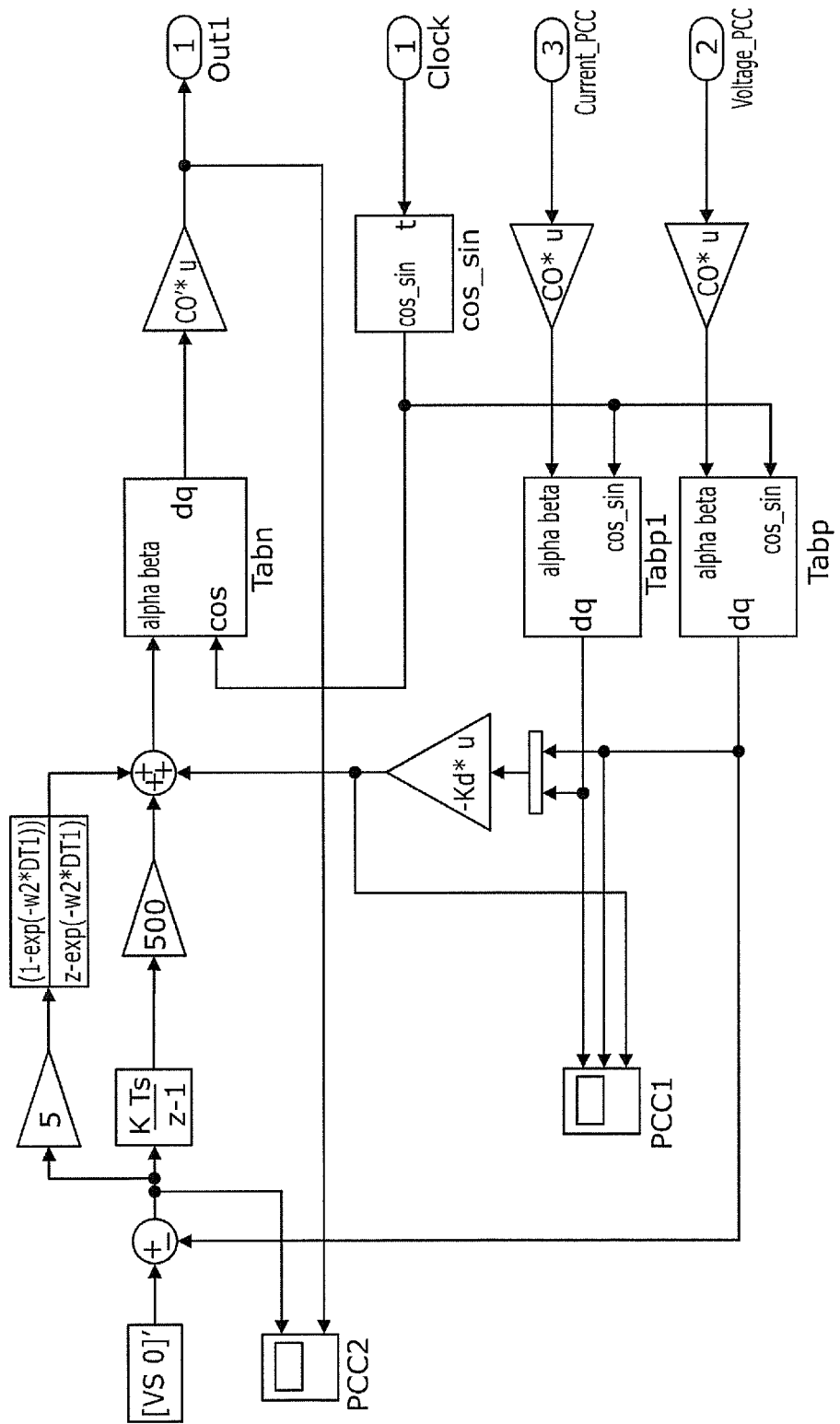
FIG. 16 schematically shows another exemplary layout of a converter controller.

FIG. 16 shows an exemplary revised converter controller to control a short circuit level of the associated AC electrical system so as to stabilise the voltage of the AC electrical system. The converter controller is implemented on, for example, a Digital Signal Processor (DSP) in which the first order low pass filter has been included in the proportional feedback. The value of the pole w2 in the converter controller implementation is 100 Hz.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power transmission network comprising a single-phase or multi-phase AC electrical system, a converter including at least one AC terminal, a point of common coupling, a phase reactance connecting the point of common coupling to the or each AC terminal of the converter, and at least one power transmission medium to interconnect the point of common coupling and the AC electrical system,
   wherein the power transmission network further includes a converter controller programmed to:
   process the voltage and current at the point of common coupling to compute a state vector corresponding to the power transmission network;
   derive a converter demand by combining the computed state vector with a plurality of control parameters, wherein the plurality of control parameters includes the capacitance of the power transmission medium or media presented at the point of common coupling and the impedance of the phase reactance; and
   operate the converter in accordance with the converter demand to control the converter voltage at the or each AC terminal and/or the voltage at the point of common coupling so as to inhibit any perturbation in the converter voltage from a target converter voltage or range resulting from the interaction between the capacitance of the power transmission medium or media and the impedance of the phase reactance.

2. The power transmission network according to claim 1 wherein the converter controller is programmed to process measurements of the voltage and current at the point of common coupling or predicted values of the voltage and current at the point of common coupling.

3. The power transmission network according to claim 1 wherein the AC electrical system includes at least one AC power element in the form of a power source.

4. The power transmission network according to claim 1 wherein the AC electrical system is an AC electrical network that includes a plurality of AC power elements, and optionally wherein each of the plurality of AC power elements is separately connected to the point of common coupling via a respective one of the power transmission media.

5. The power transmission network according to claim 1 wherein the phase reactance includes a transformer connected between the point of common coupling and the or each AC terminal of the converter.

6. The power transmission network according to claim 1 wherein the capacitance of the power transmission medium or media presented at the point of common coupling is half of the total lumped capacitance of the power transmission medium or media.

7. The power transmission network according to claim 1 wherein the plurality of control parameters is a matrix or vector of control parameters, and the converter controller is programmed to derive the converter demand by multiplying the computed state vector with the matrix or vector of control parameters to obtain a single value and by comparing the single value against a reference value to obtain a differential value that forms the converter demand.

8. The power transmission network according to claim 1 wherein the converter controller is programmed to perform linear quadratic regulation to derive the plurality of control parameters.

9. The power transmission network according to claim 1 wherein the converter controller is programmed to perform a three phase stationary reference frame to direct/quadrature rotating reference frame transformation of the computed state vector prior to its combination with the plurality of control parameters to derive the converter demand.

10. The power transmission network according to claim 1 further including an inductive or capacitive VAR compensator.

11. The power transmission network according to claim 10 wherein the capacitance of the capacitive VAR compensator is lower than the capacitance of the power transmission medium or the summed capacitance of the power transmission media.

12. The power transmission network according to claim 1 wherein the converter controller is programmed to modify the plurality of control parameters in response to a change in the capacitance of the power transmission medium or the summed capacitance of the power transmission media.

13. The power transmission network according to claim 1 wherein the converter controller is programmed to process a proportional servo gain when deriving the converter demand, the value of the proportional servo gain being set to control the short circuit level of the AC electrical system so as to stabilize the voltage of the AC electrical system.

14. The power transmission network according to claim 13 wherein the converter controller is configured to use proportional feedback to set the value of the proportional servo gain to control the short circuit level of the AC electrical system, the proportional feedback including a low pass filter.

15. A method of controlling a power transmission network, the power transmission network comprising a single-phase or multi-phase AC electrical system, a converter including at least one AC terminal, a point of common coupling, a phase reactance connecting the point of common coupling to the or each AC terminal of the converter, and at least one power transmission medium to interconnect the point of common coupling and the AC electrical system, wherein the method includes the steps of:

process the voltage and current at the point of common coupling to compute a state vector corresponding to the power transmission network;

derive a converter demand by combining the computed state vector with a plurality of control parameters, wherein the plurality of control parameters includes the capacitance of the power transmission medium or media presented at the point of common coupling and the impedance of the phase reactance; and operate the converter in accordance with the converter demand to control the converter voltage at the or each AC terminal and/or the voltage at the point of common coupling so as to inhibit any perturbation in the converter voltage from a target converter voltage or range resulting from the interaction between the capacitance of the power transmission medium or media and the impedance of the phase reactance.

* * * * *